United States Patent [19]

Shoji et al.

[11] Patent Number: 4,777,545
[45] Date of Patent: Oct. 11, 1988

[54] CIRCUIT ARRANGEMENT FOR INHIBITING WRITING ON A MAGNETIC DISK DURING THE SETTLING TIME OF A TRANSDUCER HEAD

[75] Inventors: Makoto Shoji; Hiroshi Tsuyuguchi; Satoru Kikuchi, all of Tokyo, Japan

[73] Assignee: Teac Corporation, Tokyo, Japan

[21] Appl. No.: 924,053

[22] Filed: Oct. 28, 1986

[30] Foreign Application Priority Data

Oct. 31, 1985 [JP] Japan .............................. 60-244856
Jul. 31, 1986 [JP] Japan .............................. 61-180639

[51] Int. Cl.⁴ ........................ G11B 21/08; G11B 5/55
[52] U.S. Cl. ........................................ 360/78; 360/67
[58] Field of Search ..................... 360/60, 67, 77, 78

[56] References Cited

U.S. PATENT DOCUMENTS

| | | | |
|---|---|---|---|
| 4,103,314 | 7/1978 | Case | 360/78 |
| 4,333,117 | 6/1982 | Johnson | 360/78 |
| 4,462,053 | 7/1984 | Lum et al. | 360/78 |
| 4,530,019 | 7/1985 | Penniman | 360/77 |
| 4,547,822 | 10/1985 | Brown | 360/78 |
| 4,591,933 | 5/1986 | Quackenbush | 360/78 |
| 4,639,798 | 1/1987 | Harrison et al. | 360/77 |

*Primary Examiner*—Raymond F. Cardillo
*Assistant Examiner*—Surinder Sachar

*Attorney, Agent, or Firm*—Woodcock Washburn Kurtz Mackiewicz & Norris

[57] ABSTRACT

An electric control system for an apparatus for writing and reading data on and from a flexible magnetic disk under the control of host equipment such as a central processor unit having an associated controller. The control system includes a time setting circuit responsive to stepping pulses, by which the magnetic head is transported from track to track on the disk, for determining an access time to be elapsed from the moment the head starts to be transported from any track on the disk to any other track thereon to the moment the head becomes stably positioned on the new track. Connected to the time setting circuit is an index pulse suppressor circuit which suppresses any index pulse, indicative of the rotation and angular position of the magnetic disk, that is generated during each access time and which permits the delivery to the host equipment of the subsequent index pulses that are generated after the lapse of the access time. A read data suppressor circuit is also provided which inhibits the delivery to the host equipment of any data read from the disk either during the access time or from the moment the transducer head starts moving toward a new track to the moment the first index pulse is generated after the lapse of the access time. Thus the host equipment is conditioned to commence the writing of data only after the head is stably positioned on each new track.

11 Claims, 4 Drawing Sheets

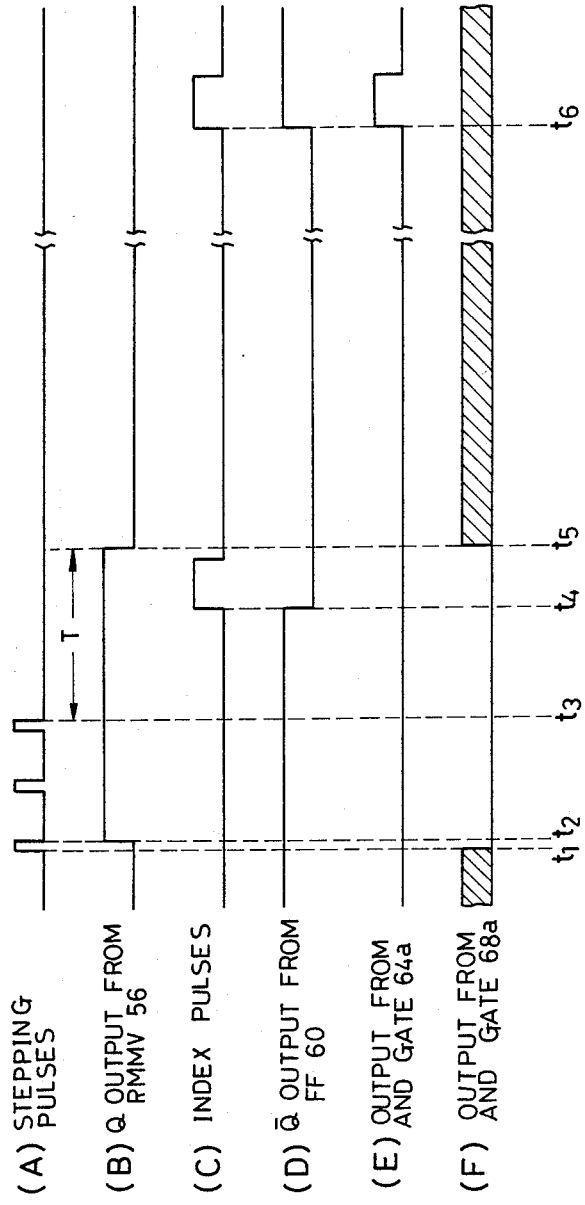

CIRCUIT ARRANGEMENT FOR INHIBITING WRITING ON A MAGNETIC DISK DURING THE SETTLING TIME OF A TRANSDUCER HEAD

BACKGROUND OF THE INVENTION

Our invention relates generally to apparatus for data transfer with magnetic disks such as those of the flexible type having a series of concentric tracks formed on one or both of these surfaces. More specifically, our invention pertains to an electric control system for use in or with such a magnetic disk apparatus, known also as a disk drive, for assuring the writing of data exactly on each predetermined track on the magnetic disk after the transducer head has been accessed thereto.

The usual practice in flexible magnetic disk drive art is to employ a stepping motor, which rotates in short and essentially uniform angular movements, in combination with a lead screw or like motion translating mechanism for transporting the transducer head radially of the magnetic disk from track to track thereon. Although the head may travel linearly from one track to another, it usually will not come to an immediate stop on the new track but will oscillate laterally thereof for some time before resting stably. We will refer to the time required for the linear travel of the head from one track to the next as the traveling time, and to the time during which the head oscillates or is unstable on the new track as the settling time. The sum of the traveling time and the settling time is what we call access time.

Should writing be commenced during the settling time, or before the end of the access time, then the written data would not subsequently be read correctly. The instruction manuals of some commercial disk drive models warn the user of this possibility. However, this warning is to no effect in some instances.

Usually, disk drives are not self contained; they are slave units under the control of host equipment typically comprising a central processor unit (CPU) having an associated controller. The host equipment may be programmed to commence writing immediately upon reception of index pulses, representative of the rotation and angular position of the magnetic disk, and of the identification signal from the disk drive. If the identification signal is delivered to the host equipment before the end of each access time of the head, writing will be commenced when the head is not yet stably positioned on the new track, resulting in the difficulties pointed out previously.

It may be contemplated to prevent the disk drive from delivering to the host equipment any data read from the disk until the head becomes stabilized on each new track. This solution will work, however, only in cases where the host equipment is programmed as above to start writing after reading that identification data. The controllers of some host equipment are constructed to set the disk drive out of operation if no data are read from the disk following the reception of the index pulses from the disk drive. The above suggested solution is not applicable to this type of apparatus.

Obviously, it would be easy for any magnetic disk specialists to overcome all the noted troubles if we were to design and manufacture each disk drive for a particular type of host equipment. The manufacturing costs of the disk drives of such diverse designs would be much higher than those of universal devices that lend themselves to use with various types of host equipment.

SUMMARY OF THE INVENTION

We have hereby invented how to prevent, in data transfer apparatus of the type defined, premature writing on the magnetic disk when the transducer head is still in the settling time on each new track on the disk, regardless of the software or hardware of the host equipment for use with the apparatus.

Our invention may be summarized as an electric control system for a data transfer apparatus of the type having a transducer head for reading and writing data from and on a magnetic disk under the control of host equipment, a head transport mechanism for transporting the transducer head from the track to track on the magnetic disk under the control of the host equipment, and an index sensor for generating an index signal, indicative of the angular position of the magnetic disk, for delivery to the host equipment. The electric control system comprises a circuit for inhibiting the delivery to the host equipment of both the index signal and the data read by the transducer head from the magnetic disk, at least during each access time, that is, from the moment the transducer head starts to be transported from any track on the magnetic disk to a desired new track thereon by the head transport mechanism to the moment the transducer head becomes stably positioned on the desired new track.

Preferably, the control system includes a time setting circuit responsive to stepping pulses, by which the magnetic head is transported from track to track on the disk, for determining an access time to be elapsed from the moment the head starts to be transported from any track on the disk to any other track thereon to the moment the head becomes stably positioned on the new track. Connected to the time setting circuit is an index pulse suppressor circuit which suppresses any index pulse, indicative of the angular position of the magnetic disk, that is generated during each access time and which permits the delivery to the host equipment of the subsequent index pulses that are generated after the lapse of the access time. A read data suppressor circuit is also provided which inhibits the delivery to the host equipment of any data read from the disk either during the access time or from the moment the transducer head starts moving toward a new track to the moment the first index pulse is generated after the lapse of the access time.

Thus, at least during each access time, the data transfer apparatus is prevented from delivering both the index pulses and the data read from the disk, to the host equipment. Accordingly, the host equipment is conditioned to commence writing on the disk only after the head is stably positioned on each new track, regardless of whether the host equipment is of the type starting writing in response to the identification data from the disk or of the type stopping the disk drive when no data is received from the disk following the reception of the index pulses.

The above and other features and advantages of our invention and the manner of realizing them will become more apparent, and the invention itself will best be understood, from a study of the following description and appended claims, with reference had to the attached drawings showing some preferable embodiments of our invention.

BRIEF DESCRIPTION OF THE DRAWINGS

FIGS. 4 (f)–(F) is a diagram showing in proper time relationship the waveforms appearing in the various parts of the alternative system of FIG. 3.

DESCRIPTION OF THE PREFERRED EMBODIMENTS

Figure 1:
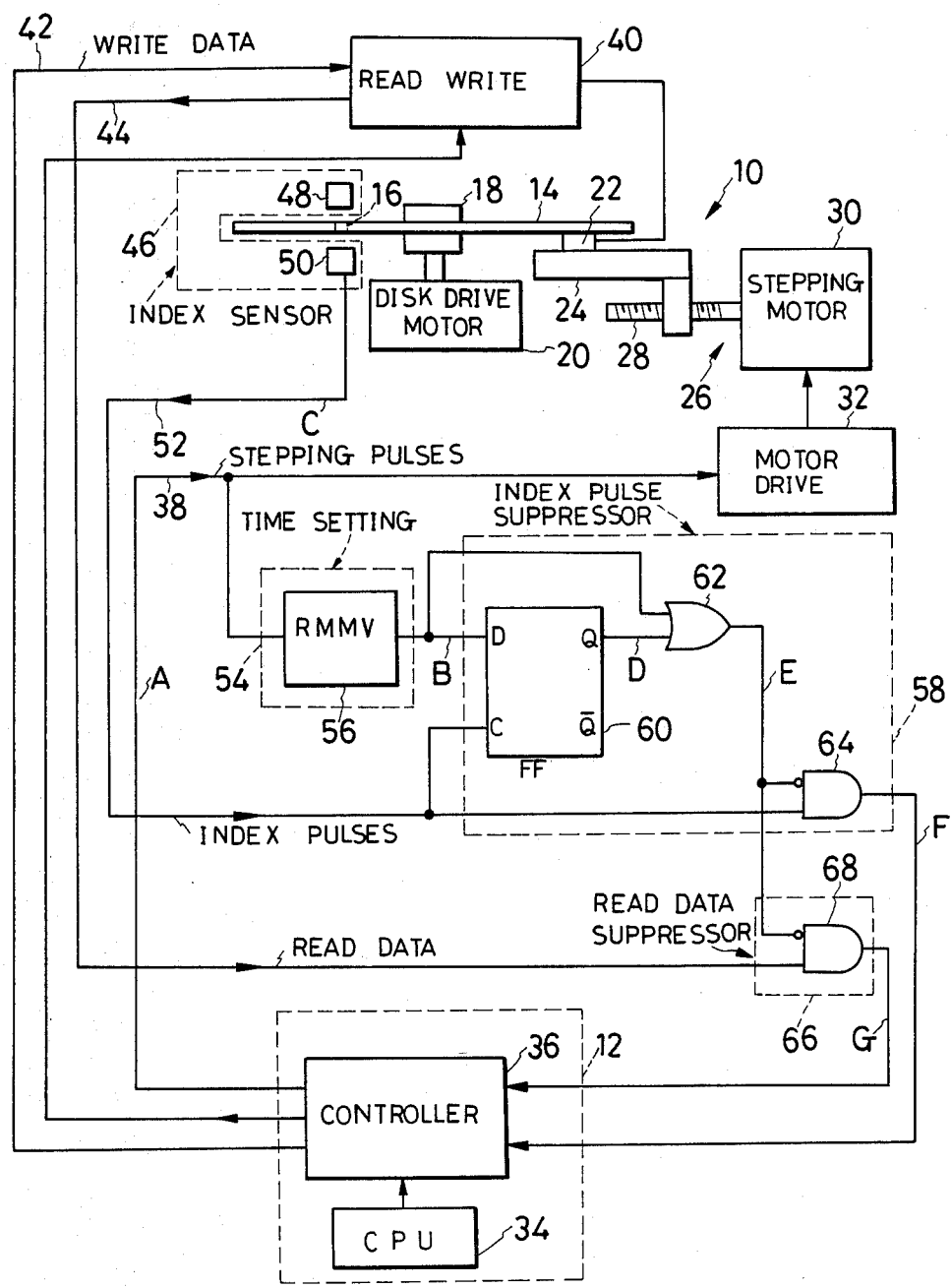
FIG. 1 is a block diagram of the electric control system of our invention shown together with some pertinent mechanical parts or components of the data transfer apparatus in which the system is incorporated, and with the host equipment controlling the apparatus.

We have block diagrammatically illustrated in FIG. 1 a typical form of the electric control system for a data transfer apparatus 10 whose mechanical construction is shown only insofar as is necessary for a full understanding of our invention. FIG. 1 also shows host equipment 12 controlling the data transfer apparatus 10, even though the apparatus may not be integrally united with such host equipment.

The particular data transfer apparatus 10 shown here is intended for use with a flexible magnetic disk 14 of the type disclosed, for example, in Castrodale et al. U.S. Pat. No. 4,089,029. actually, the magnetic disk 14 is usually enclosed in a protective envelope or jacket to make up a disk cartridge. We have, however, disregarded the envelope in the showing of FIG. 1 as it bears no particular significance to our invention. The magnetic disk 14 has initializing data prewritten on its identification and data fields in accordance with a prescribed format. Such prewritten data include identification data, additional data that may, or may not, be meaningful, and CRC bits. Any data prewritten on the data fields can be erased as new data are written thereon. The magnetic disk 14 has a series of concentric magnetic tracks on one or both sides thereof, the outermost of which is usually referred to as track zero. We assume, purely for the convenience of disclosure, that the magnetic disk 14 is single sided, having the tracks on one side only. An index opening 16 is defined eccentrically in the magnetic disk 14 for purposes to be set forth presently.

The magnetic disk 14 is coupled via a clamp assembly 18 to a disk drive motor 20, by which the disk is rotated in a predetermined direction and at a predetermined speed.

A magnetic transducer head 22 is disposed on the underside of the magnetic disk 14 for reading and writing data from and on the concentric tracks on the disk. The head 14 is mounted on a carriage 24, forming a part of a head transport mechanism 26, thereby to be transported radially of the magnetic disk 14 for accessing the individual tracks thereon. The carriage 24 is coupled via a lead screw 28 to a bidirectional head transport motor 30 which preferably is of the type known as a stepping motor. Thus, with the bidirectional, stepwise rotation of the stepping motor 30, the transducer head 14 is transported back and forth in a radial direction of the magnetic disk 14. The lead screw 28 and stepping motor 30 also constitute parts of the head transport mechanism 26.

Having thus briefly studied the mechanical organization of the data transfer apparatus 10, we will now proceed to the description of the electrical control system therefor in conjunction with the host equipment 12. In the course of such description we will refer also to FIG. 2, which shows at (A) through (G) the waveforms useful in explaining the operation of the FIG. 1 system. We have indicated in FIG. 1 the parts where the waveforms (A) through (G) of FIG. 2 appear, by the same capitals.

The stepping motor 30 is electrically connected to a drive circuit 32 thereby to be controllably energized. The drive circuit 32 is connected in turn to the host equipment 12, comprising a CPU 34 and a controller 36, by way of a line 38 for receiving therefrom a head transport signal which in this embodiment takes the form of stepping pulses shown at (A) in FIG. 2. The drive circuit 32 energizes the stepping motor 30 in response to the stepping pulses from the host equipment 12, causing the head transport mechanism 26 to transport the transducer head 22 one track for each input stepping pulse.

A read/write circuit 40 is connected between the host equipment 12 and the transducer head 22. Under the control of the controller 36 of the host equipment 12, the read/write circuit 40 functions to cause the transducer head 22 to write on, and read from, the magnetic disk 14. Although the write data are fed directly from the host equipment 12 to the read/write circuit 40 by way of a write line 42, a read line 44 for the delivery of the read data is not directly connected to the host equipment but through part of the control system of our invention, as will be explained in more detail subsequently.

At 46 in FIG. 1 is shown an index sensor of known design comprising a light source 48 and a photodetector 50 disposed on the opposite sides of the magnetic disk 14. The index sensor 46 optically detects the index opening 16 in the magnetic disk 14 and puts out electric index pulses, shown at (C) in FIG. 2, indicative of the rotation and angular position of the magnetic disk. An output line 52 of the index sensor 46 is also not directly connected to the host equipment 12 in accordance with the teachings of this invention.

The stepping pulse line 38 from the host equipment 12 is connected not only to the motor drive circuit 32 but also to a time setting circuit 54 which functions to determine the access time to be elapsed from the moment the transducer head 22 starts moving from any track on the magnetic disk 14 toward a desired new tack thereon to the moment the transducer head becomes stably positioned on the desired new track. The time setting circuit 54 takes the form of a retriggerable monostable multivibrator (RMMV) 56 in this particular embodiment. We have stated that the transducer head 22 travels one track per stepping pulse. Thus, triggered by the stepping pulse shown at (A) in FIG. 2, the RMMV 56 puts out a rectangular pulse having a predetermined duration T, FIG. 2(B), which is approximately equal to the access time (traveling time plus settling time). The output pulse of the RMMV 56 lasts from the moment t1, when the stepping pulse disappears, to the moment t3 by which time the transducer head 22 will have been stably positioned on the new track.

The host equipment 12 may supply a series of stepping pulses at a constant repetition rate. The spacings between such a series of stepping pulses are shorter than the duration T of a unit output pulse of the RMMV 56, so that the latter goes high in response to the first of the series of stepping pulses and goes low upon lapse of the time T following the disappearance of the last of the series of stepping pulses.

The time setting circuit 54, or the RMMV 56, is connected to the index pulse suppressor circuit 58 which functions to inhibit the delivery, to the host equipment 12, of any index pulse that is generated by the index sensor 46 during each access time. Only those index pulses which are generated after the end of each access time are fed through the index pulse suppressor circuit 58 on to the host equipment 12. The index pulse suppressor circuit 58 of this embodiment comprises a D flip flop 60, an OR gate 62 and an inhibit AND gate 64.

Figure 2:
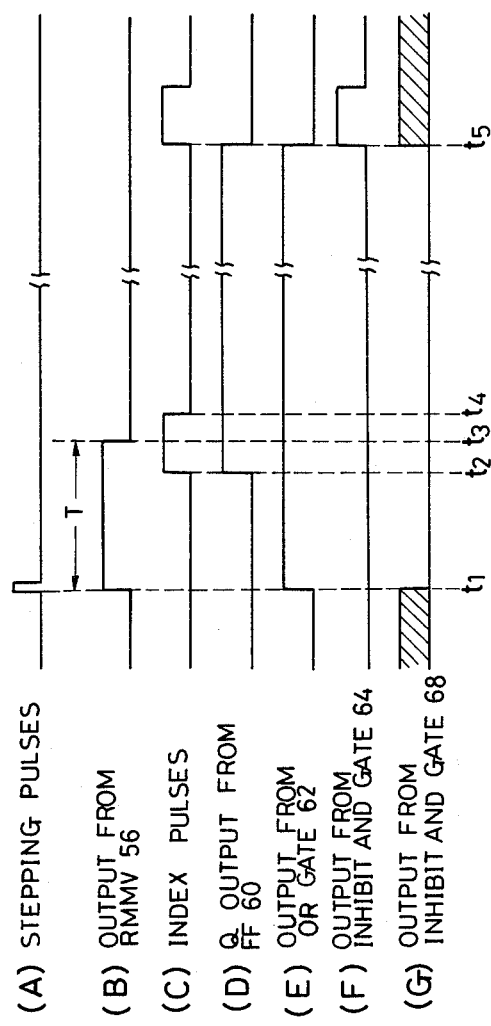
FIGS. 2 (A)–(G) is a diagram showing in proper time relationship the waveforms appearing in the various parts of the system of FIG. 1.

The D flip flop 60 has a data input D connected to the RMMV 56 and a clock input C connected to the index sensor 46 by way of the index pulse line 52. FIG. 2 shows at (B) and (C) an index pulse that is generated at a moment t2 before the output pulse of the RMMV 56 disappears at the moment t3 and which must therefore be suppressed. Clocked by the leading edge of this index pulse, the flip flop 60 latches the high output from the RMMV 56, with the result that the Q output from the flip flop goes high at the moment t2 and remains so until the moment t5 when the next index pulse is delivered to its clock input C, as indicated at (D) in FIG. 2.

The OR gate 62 has its two inputs connected respectively to the RMMV 56 and to the Q output of the flip flop 60. The output from this OR gate 62 is therefore high when either or both of the outputs from the RMMV 56 and the flip flop 60 are high. In the case under consideration, as indicated at (E) in FIG. 2, the OR gate 62 goes high at the moment t1, when the RMMV 56 goes high in response to a stepping pulse, and remains so until the moment t5, when the flip flop 60 goes low.

The inhibit AND gate 64 has its inverting input connected to the OR gate 62 and its noninverting input connected directly to the index sensor 46. Therefore, as will be seen from (F) in FIG. 2, the inhibit AND gate 64 permits the passage of the index pulses therethrough only when the output from the OR gate 62 is low. The output of the inhibit AND gate 64 is connected to the controller 36 of the host equipment 12.

The control system of FIG. 1 further includes a read data suppressor circuit 66 for inhibiting the delivery to the host equipment 12 of any data read from the magnetic disk 14 from the moment the transducer head 22 starts moving toward a new track on the magnetic disk to the moment the first index pulse appears following the termination of the ensuing access time. The read data suppressor circuit 66 comprises an inhibit AND gate 68 in this particular embodiment. The inhibit AND gate 68 has its inverting input connected to the OR gate 62 of the index pulse suppressor circuit 58, its noninverting input connected directly to the read/write circuit 40 by way of the read data line 44, and its output connected to the controller 36 of the host equipment 12. Accordingly, as represented at (G) in FIG. 2, the read data suppressor circuit 66 permits the delivery of the read data to the host equipment 12 only when the output from the OR gate 62 is low.

OPERATION

The duration T of each output pulse of the RMMV 56 covers the complete access time (sum of the traveling time and the settling time) of the transducer head 22. It might be contemplated, then, that it would suffice to inhibit the delivery to the host equipment of both the index signal and the read data only during the duration of each RMMV output pulse, that is, during each access time only. We would have adopted this scheme if we were to seek only to prevent the undesired writing on the magnetic disk during each access time. In that case, however, a problem would arise, as will be discussed in detail hereafter, because the index pulses are not generated in fixed time relation to the stepping pulses.

In FIG. 2 we have shown, by way of example, that the first index pulse after the moment t1 appears at the moment t2, preceding the moment t3 when the RMMV output pulse disappears, and disappears at the moment t4 following the moment t3. Let us suppose that, contrary to the showing of FIG. 2, the first index pulse after the moment t1 either disappears before the moment t3 or appears after the moment t3. No problem would occur in such cases if the control system of FIG. 1 were configured to prevent the delivery of the index pulses and read data only during the duration of each RMMV output pulse.

We did not adopt this scheme because of the following inconveniences arising when the first index pulse after the moment t1 appears as at (C) in FIG. 2 in relation to the RMMV output pulse shown at (B) in FIG. 2. Then, should the control system be configured to prevent the delivery of index pulses only during the duration of each RMMV output pulse, the first index pulse of FIG. 2(C) would be partly suppressed, and the remainder of this index pulse, lasting from moment t3 to moment t4, would be delivered to the host equipment 12. The leading edge of this index pulse would then shift from moment t2 to moment t3, giving rise to errors in various control actions based upon the index pulses.

From the foregoing considerations we have employed the RMMV 56 merely as the time setting circuit 54 and connected this circuit to the index pulse suppressor circuit 58 of the illustrated configuration. This suppressor circuit is effective to prevent the delivery to the host equipment 12 of any index pulse whose leading edge precedes in time the trailing edge of each RMMV output pulse. As indicated at (D) in FIG. 2, the Q output of the flip flop 60 of the suppressor circuit 58 is high from the moment t2, when the first index pulse appears after the transportation of the transducer head 22 from one track to another, to the moment t5 when the second index pulse appears. The OR gate 62 of the suppressor circuit 58 is therefore high from moment t1 to moment t5, as at (E) in FIG. 2. Thus, as shown at (F) in FIG. 2, only the second and subsequent index pulses pass intact through the inhibit AND gate 64 on to the host equipment 12 whereas the first index pulse is suppressed.

The output from the OR gate 62 of the index pulse suppressor circuit 58 is also directed to the inhibit AND gate 68 of the read data suppressor circuit 66. Therefore, as is seen at (G) in FIG. 2, the read data suppressor circuit 66 starts the delivery of the data read from the magnetic disk 14 to the host equipment 12 at the same moment t5 as the commencement of the delivery of the index pulses. Now the host equipment 12 is conditioned to start writing on the magnetic disk 14 as dictated by its program.

The host equipment 12 may be programmed to start writing immediately upon reception of the identification data from the magnetic disk 14. Then writing will be started when the identification data are read after the moment t5. Thus the data transfer apparatus 10 is prevented from writing on the magnetic disk 12 during the settling time of the transducer head 22 since the identification data are not to be delivered to the host equipment 14 before the moment t5 which comes after the settling time.

Also, as we have mentioned in the course of the description of the prior art, the controller 36 of the host equipment 12 may be configured to set the apparatus 10 out of operation when no read signal is received following the index pulses. A consideration of (F) and (G) in FIG. 2 will reveal that the read signal is fed to the controller 36 at the same time with the first index pulse after each access time. There is accordingly no possibility of the data transfer apparatus 10 being rendered inoperative even if the controller 36 is configured as above.

SECOND FORM

Figure 3:
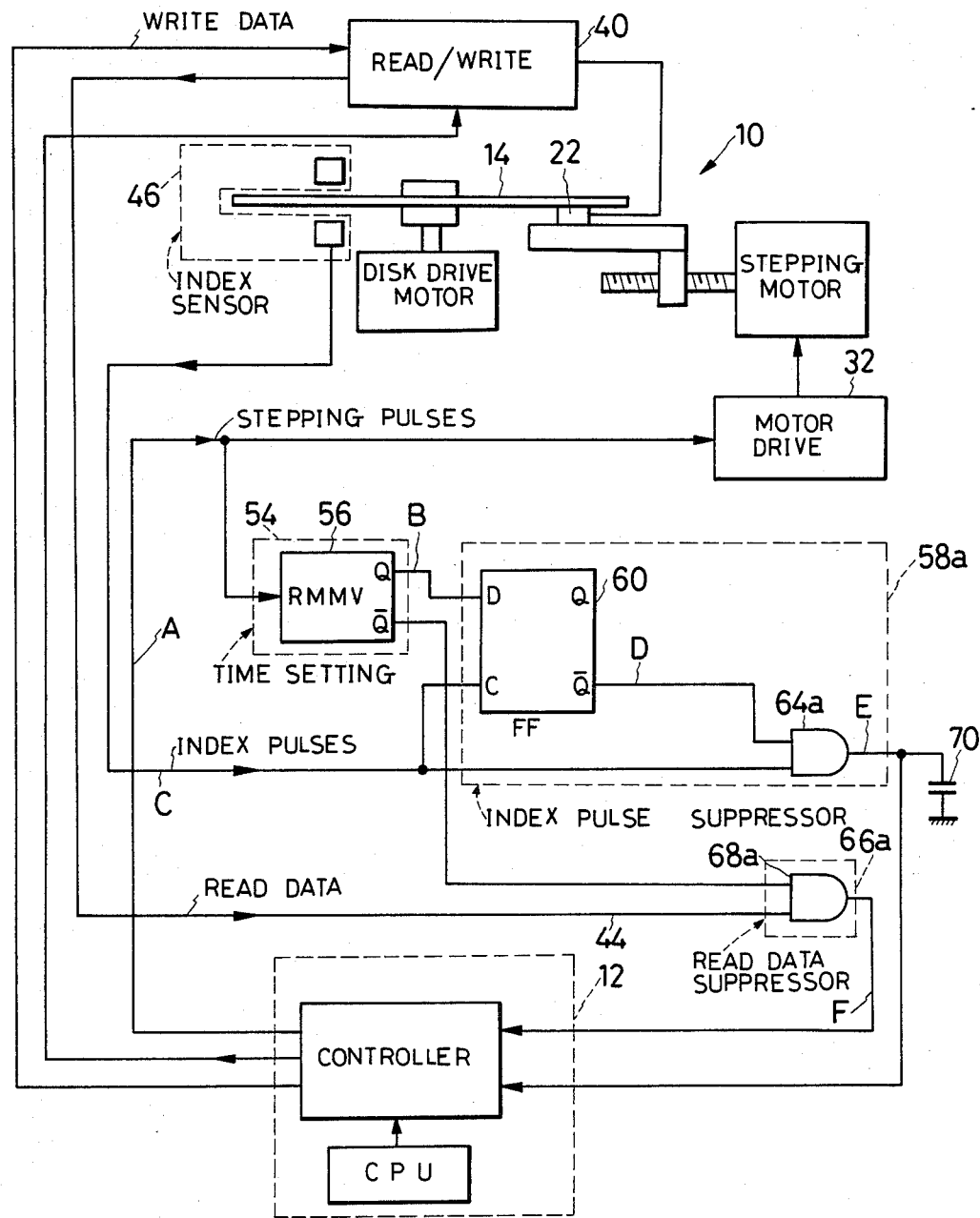
FIG. 3 is a block diagram similar to FIG. 1 but showing an alternative form of the data transfer apparatus control system in accordance with our invention.

We have illustrated in FIG. 3 an alternative form of the control system of our invention together with the data transfer apparatus 10 and host equipment 12. This alternative system differs from the FIG. 1 system primarily in not having the OR gate 62. Further the inhibit AND gates 64 and 68 of the FIG. 1 system are replaced by AND gates 64a and 68a. Thus, in this alternative embodiment, the D flip flop 60 and AND gate 64a constitute in combination the index pulse suppressor circuit 58a, whereas the AND gate 68a constitutes the read data suppressor circuit 66a.

The RMMV 56 constituting the time setting circuit 54 has both Q and $\bar{Q}$ outputs serving useful purposes in this alternative embodiment. The Q output of the RMMV 56 is connected to the data input D of the D flip flop 60, whereas its $\bar{Q}$ output is connected to the AND gate 68a of the read data suppressor circuit 66a, the other input of which is connected to the read output line 44 of the read/write circuit 40 as in the preceding embodiment. The $\bar{Q}$ output of the D flip flop 60 is connected to the AND gate 64a, the other input of which is connected to the index sensor 46. Additionally, in this alternative embodiment, the output of the AND gate 64a is grounded via a capacitor 70, besides being connected to the host equipment 12. The capacitor 70 is intended for the elimination of noise pulses of short durations.

The other constructional details of the FIG. 3 embodiment are just as set forth previously in connection with that of FIG. 1. We have therefore identified, as necessary, the various parts of the FIG. 3 embodiment by the same reference characters as used to denote the corresponding parts of the FIG. 1 embodiment.

We have diagrammatically shown at (A) through (F) in FIG. 4 the voltage waveforms appearing in those parts of the FIG. 3 system which are indicated by the same capitals. At (A) in this figure are shown three stepping pulses delivered at constant spacings from the host equipment 12 both to the stepping motor drive circuit 32, for moving the transducer head 22 from one track to another on the magnetic disk 14, and to the RMMV 56 of the time setting circuit 54. The first stepping pulse appears at a moment t1, triggering the RMMV 56 with its trailing edge at a moment t2, with the result that the Q output from the RMMV goes high at the moment t2. The RMMV 56 is retriggered by the two succeeding stepping pulses before its Q output goes low. Consequently, going high at the moment t2 as above, the q output from the RMMV 56 remains so until a moment t5, that is, until upon lapse of the predetermined time T after the last stepping pulse disappears at a moment t3. The predetermined time T is approximately equal to the access time of the transducer head 22.

At (C) in FIG. 4 we have shown the first index pulse after the head transportation to appear (at a moment t4) and disappear within the duration of the high state of the Q output from the RMMV 56. Clocked by this first index pulse, the D flip flop 60 of the index pulse suppressor circuit 58a latches the high Q output from the RMMV 56. Thus, as indicated at (D) in FIG. 4, the $\bar{Q}$ output from the D flip flop 60 is low from the moment t4 to a moment t6, at which latter moment the second index pulse appears after the accessing of the transducer head 22 to the new track. This low output is impressed to the AND gate 64a, causing the same to inhibit the delivery of the first index pulse to the host equipment 12, as shown at (E) in FIG. 4. It will be seen that and AND gate 64a permits the delivery of the second index pulse to the host equipment 12.

The AND gate 68a of the read data suppressor circuit 66a also inputs the $\bar{Q}$ output from the RMMV 56, which is low from moment t2 to moment t5, as is apparent from (B) in FIG. 4. The AND gate 68a inhibits the delivery of the read data output from the read/write circuit 40 to the host equipment 12 during this period, as shown at (F) in FIG. 4.

As will be recalled by referring back to FIGS. 1 and 2, we suppressed in the preceding embodiment the delivery of the read data to the host equipment 12 until the starting moment t5 of the delivery of the index pulses to the host equipment. In this second embodiment, however, the delivery of the read data is commenced much earlier than that of the index pulses, that is, immediately upon expiration of the high state of the Q output, or of the low state of the $\bar{Q}$ output, from the RMMV 56 of the time setting circuit 54. Such early commencement of the of the read data delivery provides the following advantages.

Let it be supposed that the first index pulse after access to the new track is generated immediately after the last of the series of stepping pulses shown at (A) in FIG. 4. Then the control system of FIG. 3 will immediately deliver to the host equipment 12 all the required read data, or all but one or two sectors of read data, after the first index pulse. If the delivery of read data is commenced at a moment intermediate the first and second index pulses generated at the moments t4 and t6, as shown at (F) in FIG. 4, such data may be effectively utilized for various control actions. This means that the host equipment 12 of the FIG. 3 embodiment has received the required data earlier than that of the FIG. 1 embodiment by one cycle of the index pulses or by one revolution of the magnetic disk 14. Possibly, the data obtained earlier than the moment t6 of FIG. 4 may be incomplete, but then the complete data will be supplied after the moment t6.

POSSIBLE MODIFICATIONS

Although we have shown and described our invention in terms of but two preferable embodiments thereof, we recognize, of course, that additional embodiments are possible within the broad teachings hereof. The following is a brief list of possible modifications or alterations of the above disclosed embodiments which we believe fall within the scope of our invention:

1. AND gates may be substituted for the inhibit AND gates 64 and 68, and a NOR gate for the OR gate 62, in the FIG. 1 embodiment.

2. The inhibit AND gate 68 of the FIG. 1 embodiment may have its inverting input connected to the inverting output of the RMMV 56, instead of to the OR gate 62, thereby making possible the earlier delivery of the read data to the host equipment than that of the index pulses as in the FIG. 3 system.

3. "Negative", instead of "positive", pulses may be used for the required operation of the control system.

4. Index pulses may be obtained from the disk drive motor, turntable for the disk, etc., instead of from the magnetic disk.

5. Our invention may be applied to apparatus for use not only with the disk assemblies of the above described type but also with those known as the "microfloppy" disks.

6. Our invention may be further applied to apparatus wherein the transducer head or heads are unloaded from the disk during access to each new track. In this application the access time determined by the time setting circuit should allow for the head loading time.

We claim:

1. An electric control system for a data transfer apparatus of the type having a read/write circuit connected to a transducer head for causing the same to read and write data from and on a magnetic disk under control of host equipment, a head transport mechanism for transporting the transducer head from track to track on the magnetic disk in response to a head transport signal from the host equipment, and an index sensor for generating index pulses, indicative of the rotation and angular position of the magnetic disk, for delivery to the host equipment, the electric control system comprising:
    (a) time setting circuit means, responsive to the head transport signal, for generating a pulse having a duration representative of an access time to be elapsed from the moment the transducer head starts to be transported from any track on the magnetic disk to a desired new track thereon by the head transport mechanism to the moment the transducer head becomes stably positioned on the desired new track;
    (b) an index pulse suppressor circuit connected to both the index sensor and the time setting circuit means for inhibiting the delivery to the host equipment of any index pulse that is generated during the access time and for permitting the delivery to the host equipment of the subsequent index pulses which are generated after the termination of the access time; and
    (c) a read data suppressor circuit connected to both the read/write circuit and the time setting circuit means for inhibiting the delivery to the host equipment of the data read from the magnetic disk by the transducer head during the access time.

2. The electric control system of claim 1 wherein the index pulse suppressor circuit comprises:
    (a) a D flip flop having a data input connected to the time setting circuit means and a clock input connected to the index sensor to be clocked by the leading edge of each index pulse; and
    (b) a gate circuit having a first input connected to the index sensor and a second input connected to the D flip flop for preventing the delivery to the host equipment of any index pulse generated when the D flip flop is set.

3. The electric control system of claim 1 wherein the read data suppressor circuit comprises a gate circuit having an first input connected to the time setting circuit and a second input connected to the read/write circuit for inhibiting the read data output from the read/write circuit when the output from the time setting circuit means is in a prescribed state.

4. An electric control system for a data transfer apparatus of the type having a read/write circuit connected to a transducer head for causing the same to read and write data from and on a magnetic disk under control of host equipment, a head transport mechanism for transporting the transducer head from track to track on the magnetic disk in response to a head transport signal from the host equipment, and an index sensor for generating index pulses, indicative of the rotation and angular position of the magnetic disk, for delivery to the host equipment, the electric control system comprising:
    (a) time setting circuit means, responsive to the head transport signal, for generating a pulse having a duration representative of an access time to be elapsed from the moment the transducer head starts to be transported from any track on the magnetic disk to a desired new track thereon by the head transport mechanism to the moment the transducer head becomes stably positioned on the desired new track;
    (b) an index pulse suppressor circuit connected to both the index sensor and the time setting circuit means for inhibiting the delivery to the host equipment of any index pulse that is generated during the access time and for permitting the delivery to the host equipment of the subsequent index pulses which are generated after the termination of the access time; and
    (c) a read data suppressor circuit connected to both the read/write circuit and the index pulse suppressor circuit for inhibiting the delivery to the host equipment of the data read from the magnetic disk by the transducer head, from the moment the transducer head starts to be transported toward the desired new track on the magnetic disk to the moment the first index pulse is generated after the termination of the access time.

5. The electric control system of claim 4 wherein the index pulse suppressor circuit comprises:
    (a) a D flop having a data input connected to the time setting circuit means and a clock input connected to the index sensor;
    (b) a logic circuit having a first input connected to the time setting circuit means and a second input connected to the D flip flop for permitting the passage therethrough of the output pulses of both the time setting circuit and the D flip flop; and
    (c) a gate circuit having a first input connected to the logic circuit and a second input connected to the index sensor for inhibiting the index pulses when the output from the logic circuit is in a prescribed state.

6. An electric control system for a data transfer apparatus of the type having a read/write circuit connected to a transducer head for causing the same to read and write data from and on a magnetic disk under control of host equipment, a head transport mechanism for transporting the transducer head from track to track on the magnetic disk in response to a head transport signal from the host equipment, and an index sensor for generating index pulses, indicative of the rotation and angular position of the magnetic disk, for delivery to the host equipment, the electric control system comprising:

(a) a time setting circuit responsive to the head transport signal for determining an access time to be elapsed from the moment the transducer head starts to be transported from any track on the magnetic disk to a desired new track thereon by the head transport mechanism to the moment the transducer head becomes stably positioned on the desired new track, wherein the time setting circuit comprises a retriggerable monostable multivibrator for generating pulses of a predetermined duration in response to the head transport signal, the predetermined duration of each output pulse of the retriggerable monostable multivibrator being representative of the access time;

(b) an index pulse suppressor circuit connected to both the index sensor and the time setting circuit for inhibiting the delivery to the host equipment of any index pulse that is generated during the access time and for permitting the delivery to the host equipment of the subsequent index pulses which are generated after the termination of the access time; and (c) a read data suppressor circuit connected to both the read/write circuit and the index pulse suppressor circuit for inhibiting the delivery to the host equipment of the data read from the magnetic disk by the transducer head during the access time.

7. The electric control system of claim 6 wherein the index pulse suppressor circuit comprises:
(a) a D flip flop having a data input connected to the retriggerable monostable multivbrator and a clock input connected to the index sensor to be clocked by the leading edge of each index pulse; and
(b) a gate circuit having a first input connected to the index sensor and a second input connected to the D flip flop for preventing the delivery to the host equipment of any index pulse generated when the D flip flop is set.

8. The electric control system of claim 6 wherein the read data suppressor circuit comprises a gate circuit having a first input connected to the retriggerable monostable multivibrator and a second input connected to the read/write circuit for inhibiting the read data output from the read/write circuit when the output from the retriggerable monostable multivibrator is in a prescribed state.

9. An electric control system for a data transfer apparatus of the type having a read/write circuit connected to a transducer head for causing the same to read and write data from and on a magnetic disk under control of host equipment, a head transport mechanism for transporting the transducer head from track to track on the magnetic disk in response to a head transport signal from the host equipment, and an index sensor for generating index pulses, indicative of the rotation and angular position of the magnetic disk, for delivery to the host equipment, the electric control system comprising:

(a) a time setting circuit responsive to the head transport signal for determining an access time to be elapsed from the moment the transducer head starts to be transported from any track on the magnetic disk to a desired new track thereon by the head transport mechanism to the moment the transducer head becomes stably positioned on the desired new track, wherein the time setting circuit comprises a retriggerable monostable multivibrator for generating pulses of a predetermined duration in response to the head transport signal, the predetermined duration of each output pulse of the retriggerable monostable multivibrator being representative of the access time;

(b) an index pulse suppressor circuit connected to both the index sensor and the time setting circuit for inhibiting the delivery to the host equipment of any index pulse that is generated during the access time and for permitting the delivery to the host equipment of the subsequent index pulses which are generated after the termination of the access time; and (c) a read data suppressor circuit connected to both the read/write circuit and the index pulse suppressor circuit for inhibiting the delivery to the host equipment of the data read from the magnetic disk by the transducer head, from the moment the transducer head starts to be transported toward the desired new track on the magnetic disk to the moment the first index pulse is generated after the termination of the access time.

10. The electric control system of claim 9 wherein the index pulse suppressor circuit comprises:
(a) a D flip flop having a data input connected to the retriggerable monostable multivibrator and a clock input connected to the index sensor;
(b) a logic circuit having a first input connected to the retriggerable monostable multivibrator and a second input connected to the D flip flop for permitting the passage therethrough of the output pulses of both the retriggerable monostable multivibrator and the D flip flop; and
(c) a gate circuit having a first input connected to the logic circuit and a second input connected to the index sensor for inhibiting the index pulses when the output from the logic circuit is in a prescribed state.

11. The electric control system of claim 10 wherein the read data suppressor circuit comprises a second gate circuit having a first input connected to the logic circuit and a second input connected to the read/write circuit for inhibiting the read data output from the read/write circuit when the output from the logic circuit is in a prescribed state.

* * * * *